United States Patent

Kobayashi et al.

Patent Number: 4,766,651
Date of Patent: Aug. 30, 1988

[54] BAND CLAMP

[75] Inventors: Shigehiko Kobayashi; Mamoru Ono, both of Toyota, Japan

[73] Assignee: Yazaki Corporation, Tokyo, Japan

[21] Appl. No.: 88,451

[22] Filed: Aug. 24, 1987

[51] Int. Cl.$^4$ .............................................. B65D 63/00
[52] U.S. Cl. .................................. 24/16 PB; 248/74.3
[58] Field of Search ............... 24/16 PB, 17 A, 17 B, 24/17 AP, 30.5 P, 487, 569, 136 R, 136 L; 248/74.3, 74.5; 292/318, 322, 321

[56] References Cited

U.S. PATENT DOCUMENTS

| | | | |
|---|---|---|---|
| 2,917,799 | 12/1959 | Meighan | 24/136 R |
| 3,063,121 | 11/1962 | Coulter | 24/569 |
| 3,581,349 | 6/1971 | Verspieren | 24/16 PB |
| 3,855,669 | 12/1974 | Meyer | 24/16 PB |
| 4,191,334 | 3/1980 | Bulanda et al. | 24/16 PB |
| 4,275,485 | 6/1981 | Hutchison | 24/30.5 P |
| 4,490,886 | 1/1985 | Omata | 248/74.3 |
| 4,601,451 | 7/1986 | Leonardo | 24/569 |

FOREIGN PATENT DOCUMENTS

| | | | |
|---|---|---|---|
| 1123839 | 9/1956 | France | 24/16 PB |
| 70048 | 10/1958 | France | 24/16 PB |

Primary Examiner—Victor N. Sakran
Attorney, Agent, or Firm—Armstrong, Nikaido, Marmelstein & Kubovcik

[57] ABSTRACT

A band clamp for bundling cables in an automobile. The band clamp has a body 10 with a band 12 extending from one end thereof and a band receiving aperture 15 another end. In the lower side, the band 12 has a plurality of grooves 13 laterally extending while a locking pawl 16 is formed in the inner wall 15' of the band receiving slot 15 for engagement with one of the grooves. The band clamp further has a pair of upstanding walls 20 having a V-shaped cuts on their top surfaces. Cables C placed on the body across the V-shaped cuts is subjected to a positive clamping power in the V-shaped cuts.

3 Claims, 3 Drawing Sheets

Prior Art

BAND CLAMP

BACKGROUND OF THE INVENTION

This invention relates to a band clamp mounted at a panel such as an automotive body for bundling cables.

A conventional band clamp mounted at a panel such as an automotive panel for bundling automotive cables is disclosed in Japanese Utility Model Laid-open No. 69385/1979 official gazette.

According to the conventional technique, as shown in FIG. 6, clip 2 formed at a plastic band clamp body 1 is snap fitted into an insertion opening formed in a panel S such as a vehicle body to secure the body 1 for bundling cables C thereto.

An elongated plastic strip band 3 projected from the body 1 to bundle the wiring cables C has laterally extending engaging grooves 4 spaced at an interval longitudinally on one surface thereof.

Elastic detent means 6 is provided in a band insertion opening 5 which is formed through the body 1, and an engaging pawl 7 is projected from an intermediate portion of the detent means 6.

The tip 8 of the detent means 6 functions as a lever for moving the pawl 7 downward.

To bundle the cables C by the band clamp constructed as described above, the end 9 of the band 3 passed around the cables C is pulled through the insertion opening 5 rightward in FIG. 6.

The fastening power of the band is maintained by engaging the elastically projected pawl 7 with the groove 4.

To release the fastening power of the band, the tip 8 of the detent means 6 is pressed down to disengage the pawl 7 from the groove 4.

However, such a prior technique has a drawback that the fastening power of the band 3 for bundling the cables C is so weak that the cables C tend to be laterally displaced or to rotate about axes thereof.

SUMMARY OF THE INVENTION

An object of this invention is to provide a band clamp which can eliminate the abovementioned drawback of the conventional technique.

In order to achieve this and other objects, there is provided a band clamp comprising a generally planar body having first and second sides, said body further having first and second ends; a band extending from said first end and having first and second sides corresponding to the first and second sides of the body; a band receiving slot laterally formd in the second end of the body; a fixing clip mounted on the second side of the body for fixing the same to an automotive panel or the like; said band being formed with a plurality of laterally extending grooves spaced apart from each other in a longitudinal direction in the second side thereof; said band receiving slot having on an outward side thereof an inner wall formed with a pawl projecting laterally into said slot; said inner wall defining a manually deflectable lever; and a pair of upright walls standing from said first side of the body parallelly with respect to said band, upper edges of the respective upright walls being in the form of the V-shaped cuts. Other and further objects, features and advantages of the invention will appear more fully from the following description.

BRIEF DESCRIPTION OF THE DRAIWNGS

DETAILED DESCRIPTION OF THE PREFERRED EMBODIMENT

An embodiment of the present invention will be described in detail with reference to the accompanied drawings.

Figure 1:
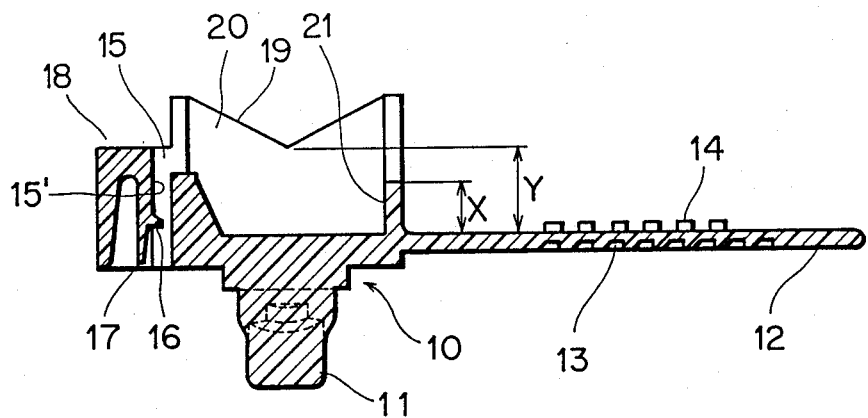
FIG. 1 is a sectional front view showing an embodiment of a band clamp according to the present invention.
Figure 2:
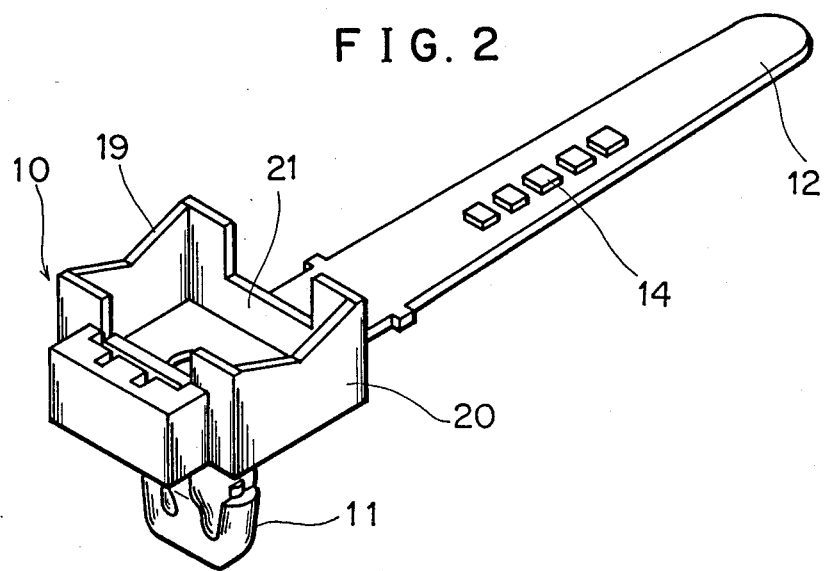
FIG. 2 is a perspective view of the band clamp.

In FIG. 1 and FIG. 2, a generally planar body 10 having upper and lower sides is shown to have a fixing clip 11 attached to said lower side thereof for securing the body 10 to a panel such as an automobile body; said fixing clip 11 is of any known elastic structure which snap fits into an insertion aperture formed in the panel. Said body 10 also has a band 12 extending from one end thereof. In a lower side of said band 12, there are formed a plurality of laterally extending grooves 13 spaced apart from each other in a longitudinal direction and a plurality of ribs 14 on an upper side thereof arranged longitudinally.

At the other end of the body 10, there is formed a band receiving slot 15 extending laterally. Said band receiving slot 15 has a band locking structure 18 including an inner wall 15' on the outward side of the band receiving slot 15, a locking pawl 16 formed in said inner wall 15' for engaging with one of the grooves 13 in the band 12 when said band 12 is inserted into the band receiving slot 15 and a manually deflectable lock releasing lever 17 for releasing the engagement of the pawl 16 from the groove 13.

On the upper side of the body 10, there are provided a pair of upstanding walls 20 standing therefrom parallel with respect to the edges of said band 12 at opposite lateral ends of the body 10. Upper edges 19 of the respective upstanding walls 20 are in the form of V-shaped cuts.

It is desirable to have the lowest points of the cuts 19 centrally located and aligned with each other. The V-shape of the cuts 19 function to enhance the fastening power of the band against the cables placed on the body.

Figure 3:
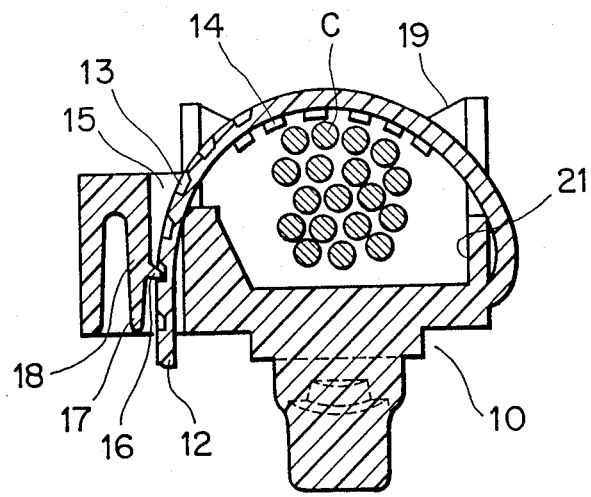
FIG. 3 is a sectional front view of the band clamp bundling cables.
Figure 4:
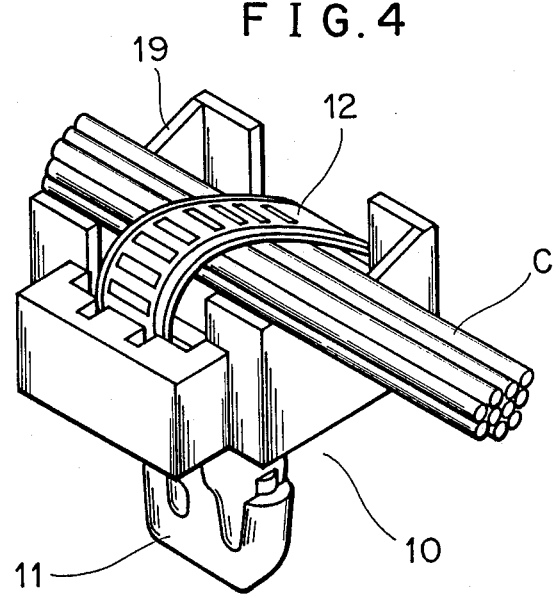
FIG. 4 is a perspective view of the band clamp bundling cables.

Further, there is provided a band support rib 21 erected on the body 10 at the end from which the band 12 extends. As shown in FIG. 3, said band support rib 21 functions to support the root portion of the band 12 when said band 12 is passed around the cables C placed on the body 10 across the V-shaped cuts 19 to avoid an excessive bending of the band 12 at its root portion. As shown in FIG. 1, the height X of the top support portion of the rib 21 is less than that Y of the lowest points of the V-shaped cuts to secure the positive fastening power of the cables C.

The ribs 14 disposed on the upper surface of the band 12 contacts the cables C as shown in FIG. 3 when the cables C are bundled by the band 12 to prevent the cables C from being longitudinally and rotatably moved.

The cables are bundled by the band clamp as below in the embodiment constructed and described as above.

Figure 5:
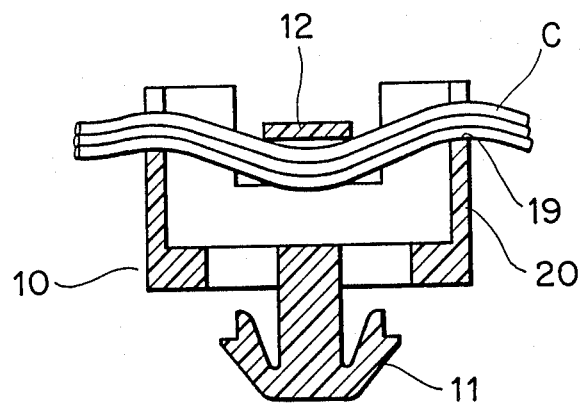
FIG. 5 is a sectional side view of the band clamp.
Figure 6:
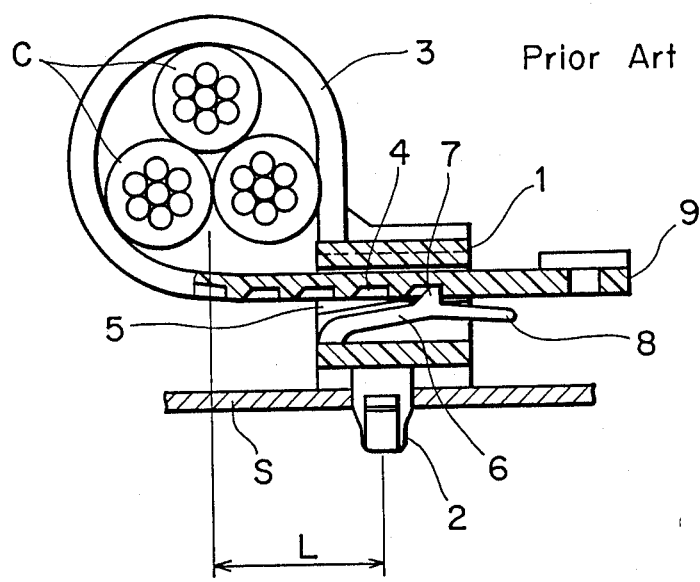
FIG. 6 is a sectional front view of a band clamp of prior art.

When the cables C are placed on the cable retainer cuts 19 and the band 12 surrounded on the cables C is inserted into the band receiving slot 15 to be fastened, the cables C are elastically deformed as shown in FIG. 5.

The locking pawl 16 is engaged with one of the grooves 13 to maintain the clamping power of the band 12.

The ribs 14 contact the cables C to prevent the cables C from moving and rotating.

The band clamp for securely bundling the cables C is fixed by inserting the fixing clamp 11 into the insertion aperture formed in the panel such as an automotive body.

To release the bundle of the cables C, the lock releasing lever 17 is deflected to disengage the pawl 16 from the groove 13.

According to the present invention as described above, the present invention provides an advantage in that since the cables are placed on two V-shaped cuts and the center of the bundle is clamped by the band, the cables are elastically deformed to obtain a strong bundling power which might not loosen the cables.

What is claimed is:

1. A band clamp for bundling and securing a plurality of automotive electric cables against movement comprising:
    a generally planar body (10) having first and second sides, said body further having first and second ends;
    a band (12) extending from said first end and having first and second sides corresponding to the first and second sides of said body;
    a band receiving slot (15) laterally formed in the second end of said body;
    a fixing clip (11) mounted on the second side of said body (10) for fixing the same to and automotive panel or the like;
    said band being formed with a plurality of ribs (14) spaced longitudinally along the first side thereof and with a plurality of laterally extending grooves (13) spaced apart from each other in a longitudinal direction in the second side thereof;
    said band receiving slot (15) having on an outward side thereof an inner wall formed with a pawl (16) projecting laterally into said slot (15) for locking engagement with said grooves (13);
    said inner wall defining a manually deflectable lever (17);
    a pair of walls (20) upstanding from said first side of said body and parallel to the edges of said band (12), each of said walls having an upper edge (19) in the form of an upwardly open V-shaped cut with the lowest points of said V-shaped cuts centrally located and aligned with each other; and
    a band support rib (21) having a top support portion erected on said first side of said body at said first end thereof with said top support portion lower than said lowest points of said V-shaped cuts,
    whereby when said cables are placed on said V-shaped cuts and said band is secured in said band receiving slot, said cables will be elastically deformed and secured against longitudinal movement between said V-shaped slots and said ribs will contact said cables and prevent lateral movement and rotation of said cables.

2. A band clamp according to claim 1, wherein a stopper tab is provided on each edge of said band adjacent said band support rib.

3. A band clamp according to claim 1, wherein said band (12) is a flecible strip integrally formed with said body (10).

* * * * *